(12) United States Patent
Tanaka

(10) Patent No.: US 8,746,740 B2
(45) Date of Patent: Jun. 10, 2014

(54) STEERING COLUMN DEVICE

(71) Applicant: JTEKT Corporation, Osaka (JP)

(72) Inventor: Eiji Tanaka, Kitakatsuragi-gun (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/910,617

(22) Filed: Jun. 5, 2013

(65) Prior Publication Data

US 2013/0327177 A1  Dec. 12, 2013

(30) Foreign Application Priority Data

Jun. 12, 2012  (JP) .................. 2012-133171

(51) Int. Cl.
*B62D 1/18* (2006.01)
*B62D 1/185* (2006.01)

(52) U.S. Cl.
CPC . *B62D 1/18* (2013.01); *B62D 1/185* (2013.01)
USPC ............. 280/777; 280/775; 280/771; 74/493; 74/502

(58) Field of Classification Search
CPC .......... B62D 1/18; B62D 1/181; B62D 1/184; B62D 1/185; B62D 1/187; B62D 1/192; B62D 1/195
USPC ................... 280/771, 775, 777; 74/493, 502
See application file for complete search history.

(56) References Cited

U.S. PATENT DOCUMENTS

| 5,117,707 | A | * | 6/1992 | Kinoshita et al. ............. 74/493 |
| 5,361,646 | A | * | 11/1994 | Venable ......................... 74/531 |
| 5,363,716 | A | * | 11/1994 | Budzik et al. ................. 74/493 |
| 5,439,252 | A | * | 8/1995 | Oxley et al. ................. 280/775 |
| 6,581,965 | B2 | * | 6/2003 | Lutz ............................ 280/775 |
| 7,306,259 | B2 | * | 12/2007 | Tinnin et al. ................ 280/775 |
| 2005/0217407 | A1 | * | 10/2005 | Yamamura ..................... 74/492 |
| 2011/0210537 | A1 | * | 9/2011 | Uesaka ........................ 280/775 |

FOREIGN PATENT DOCUMENTS

JP   A-2009-29224   2/2009

* cited by examiner

*Primary Examiner* — Faye M Fleming
*Assistant Examiner* — Darlene P Condra
(74) *Attorney, Agent, or Firm* — Oliff PLC

(57) ABSTRACT

A steering column device includes a tilt bracket that is fixed to a vehicle body, and a telescopic bracket that is fixed to a column jacket. A lock mechanism includes a fastening shaft that is inserted through a first side plate and a second side plate of the tilt bracket, and a third side plate and a fourth side plate of the telescopic bracket, and achieves tilt locking and telescopic locking by fastening the third and fourth side plates by using the first and second side plates. Tilt friction plates and telescopic friction plates are provided separately from each other on right and left sides of the tilt bracket, respectively.

4 Claims, 7 Drawing Sheets

STEERING COLUMN DEVICE

INCORPORATION BY REFERENCE

This application claims priority to Japanese Patent Application No. 2012-133171 filed on Jun. 12, 2012 the disclosure of which, including the specification, drawings and abstract, is incorporated herein by reference in its entirety.

BACKGROUND OF THE INVENTION

1. Field of the Invention

The invention relates to a steering column device.

2. Discussion of Background

In a vehicle steering system, an impact absorbing mechanism is provided, in which a steering column moves to the front of a vehicle in accordance with a movement of a driver to the front at the time of a vehicle collision so as to absorb an impact. Meanwhile, there is a position adjustable steering column device that enables a steering column to move in a tilt direction and a telescopic direction in order to perform tilt adjustment and telescopic adjustment of the position of a steering wheel.

In this type of position adjustable steering column device, a fastening mechanism is provided in order to fix the adjusted position of a steering column by fastening a side plate of a column bracket that is fixed to the steering column, by using a side plate of a fixed bracket that is fixed to a vehicle body. In Japanese Patent Application Publication No. 2009-29224 (JP 2009-29224 A), a plurality of tilt friction plates and telescopic friction plates are stacked. Each of the tilt friction plates has a fastening shaft insertion hole through which a fastening shaft is inserted, and is fixed to a column bracket, and each of the telescopic friction plates has a fastening shaft insertion hole through which the fastening shaft is inserted, and is fixed to a fixed bracket. When fastening is performed by a fastening mechanism, both of the friction plates are fastened and frictionally engaged with each other, thus increasing a binding force of both of the brackets.

In JP 2009-29224 A, when the numbers of the tilt friction plates and the telescopic friction plates, which are overlapped with each other, are the same, it is not possible to set a retaining force in a tilt direction and a retaining force in a telescopic direction independently from each other. When one tilt friction plate is provided on each of right and left sides, and three telescopic friction plates are provided on each of right and left sides, a retaining force in the tilt direction is small. Therefore, if a component of a load in the tilt direction at the time of a second collision is too large, slippage may occur in the tilt direction between both of the brackets. In such a case, since contact between the tilt friction plate and the telescopic friction plates is changed from a static friction state to a dynamic friction state, slippage may occur not only in the tilt direction but also in the telescopic direction. In other words, the retaining force at the time of a second collision may be reduced practically.

SUMMARY OF THE INVENTION

The invention provides a steering column device that makes it possible to set a retaining force in a tilt direction and a retaining force in a telescopic direction independently from each other, and to practically keep a high retaining force at the time of a second collision.

According to a feature of an example of the invention, a steering column device includes a tilt bracket that is fixed to a vehicle body, and a telescopic bracket that is fixed to a column jacket. A lock mechanism includes a fastening shaft that is inserted through a first side plate and a second side plate of a tilt bracket, and a third side plate and a fourth side plate of a telescopic bracket, and the lock mechanism achieves tilt locking and telescopic locking by fastening the third and fourth side plates by using the first and second side plates. A telescopic friction plate and a tilt friction plate are provided separately from each other on right and left sides of the tilt bracket, respectively.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
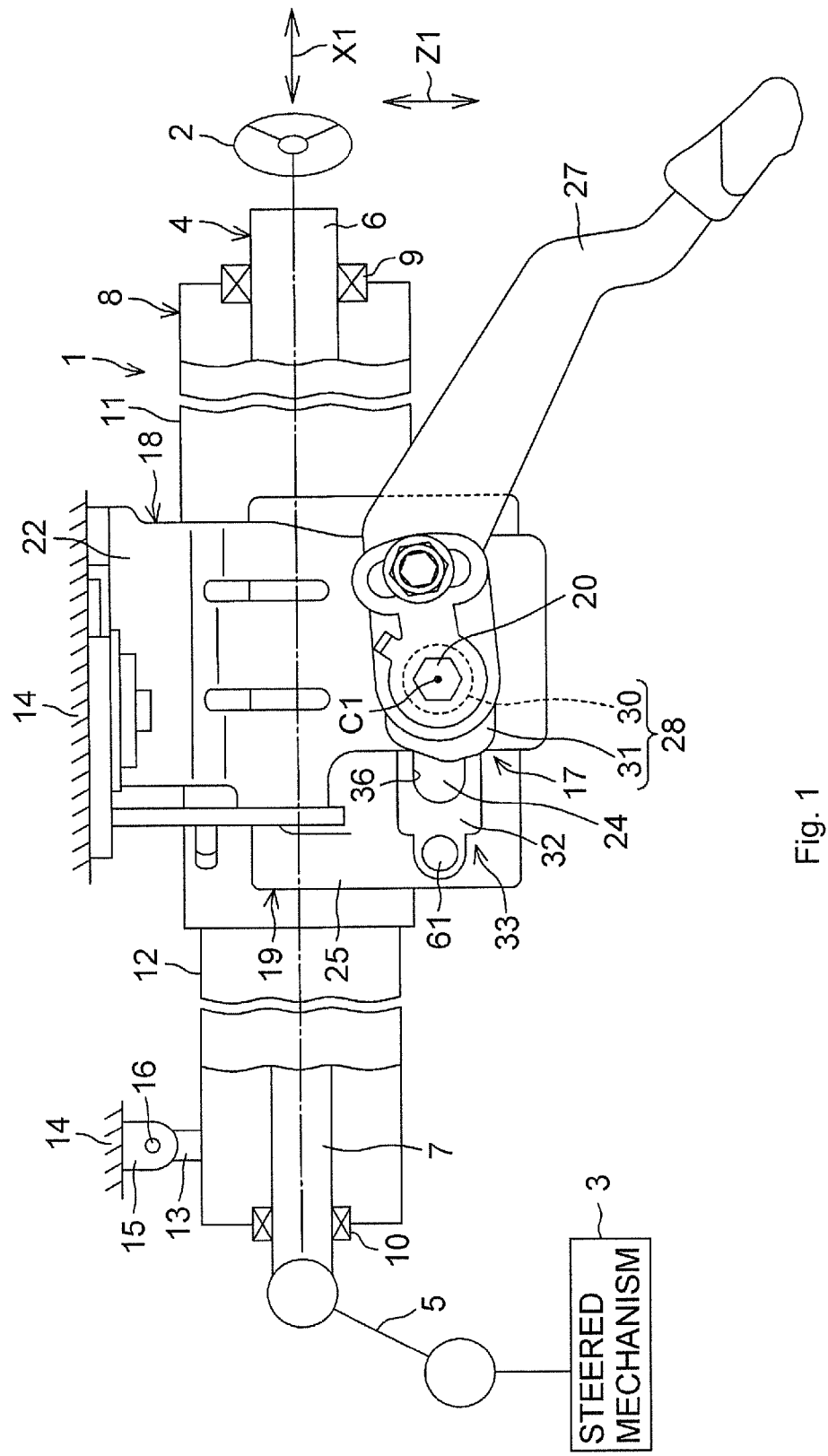
FIG. 1 is a schematic view of a steering column device according to an embodiment of the present invention, showing a structure of the steering column device seen from a left side.

FIG. 1 is a schematic view showing a general structure of a steering column device according to an embodiment of the present invention. With reference to FIG. 1, a steering column device 1 includes a steering member 2 such as a steering wheel, and a steered mechanism 3 by which steered wheels (not shown) are steered in conjunction with steering of the steering member 2. As the steered mechanism 3, a rack and pinion mechanism, for example, is used.

The steering member 2 and the steered mechanism 3 are mechanically connected with each other through a steering shaft 4, an intermediate shaft 5, and so on. Rotation of the steering member 2 is transmitted to the steered mechanism 3 through the steering shaft 4, the intermediate shaft 5, and so on. Rotation transmitted to the steered mechanism 3 is converted to an axial movement of a rack shaft (not shown). Thus, the steered wheels are steered. The steering shaft 4 has a tubular upper shaft 6 and a tubular lower shaft 7 that are, for example, fitted to each other via splines so as to be slidable relative to each other. The steering member 2 is connected to one end of the upper shaft 6. The steering shaft 4 is extendable and contactable in an axial direction of the steering shaft 4. The steering shaft 4 is inserted through a tubular column jacket 8, and is supported by the column jacket 8 via a plurality of bearings 9 and 10 so that the steering shaft 4 is rotatable.

The column jacket 8 has an outer tube 11 that serves as an upper tube, and an inner tube 12 that serves as a lower tube. Both of the tubes 11 and 12 are fitted to each other so as to be slidable relative to each other in an axial direction X1. Thus, the column jacket 8 is extendable and contactable in the axial direction X1, and enables telescopic adjustment that will be described later. The outer tube 11 supports the upper shaft 6 via the bearing 9 so that the upper shaft 6 is rotatable. The outer tube 11 is connected to the upper shaft 6 via the bearing 9 so that the outer tube 11 is able to move in the axial direction X1 together with the upper shaft 6.

A lower column bracket 13 is fixed to an outer periphery of the inner tube 12. The lower column bracket 13 is supported by a lower fixed bracket 15, which is fixed to a vehicle body 14, so that the lower column bracket 13 is able to turn via a tilt central shaft 16. The column jacket 8 and the steering shaft 4 are able to turn about the tilt central shaft 16. By turning the steering shaft 4 and the column jacket 8 about the tilt central shaft 16, the position of the steering member 2 in a height direction Z1 (corresponding to a tilt direction) is adjusted (so-called tilt adjustment). By extending and contracting the steering shaft 4 and the column jacket 8 in the axial direction X1 (corresponding to a telescopic direction), the position of the steering member 2 in the axial direction and the position of the steering member 2 in the height direction are adjusted (so-called telescopic adjustment).

Figure 2:
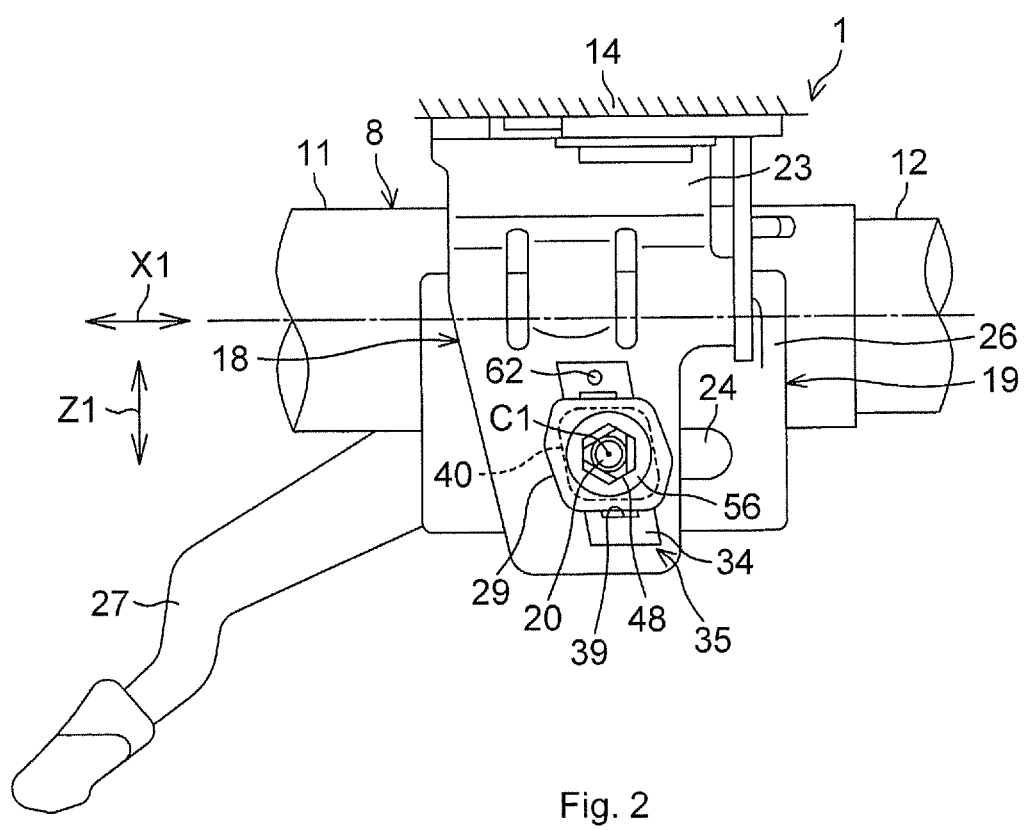
FIG. 2 is a side view of the steering column device seen from a right side.

The steering column device 1 includes a lock mechanism 17 in order to achieve tilt locking and telescopic locking so as to fix the adjusted position of the steering member 2. A tilt bracket 18 is fixed to the vehicle body 14. A telescopic bracket 19 is fixed to the outer tube 11 (the upper tube). With reference to FIG. 1, FIG. 2 showing the steering column device 1 seen from the right side, and FIG. 3 that is a sectional front view of the steering column device 1, the tilt bracket 18 has a first side plate 22 and a second side plate 23, each of which has a vertically long hole 21 through which a fastening shaft 20 is inserted.

The telescopic bracket 19 has a third side plate 25 and a fourth side plate 26, each of which has a horizontally long hole 24. The third side plate 25 of the telescopic bracket 19 extends along an inner side surface 22a of the first side plate 22 of the tilt bracket 18, and the fourth side plate 26 of the telescopic bracket 19 extends along an inner side surface 23a of the second side plate 23 of the tilt bracket 18. The lock mechanism 17 includes a cam mechanism 28 which operates in accordance with a rotating operation of an operating lever 27 that is rotatable about an axis C1 of the fastening shaft 20 that extends through the side plates 22, 23, 25, and 26 of both of the brackets 18 and 19, and a pressing member 29 that is arranged on a side opposite to the cam mechanism 28 in an axial direction Y1 of the fastening shaft 20. The cam mechanism 28 is arranged outside the first side plate 22 of the tilt bracket 18, and the pressing member 29 is arranged outside the second side plate 23 of the tilt bracket 18.

The cam mechanism 28 includes a cam 30 that is rotatable together with the operating lever 27, and a cam follower 31 which is not rotatable, is engaged with the cam 30, and is able to move in the axial direction Y1 of the fastening shaft 20. Cam protrusions are formed on contact surfaces of the cam 30 and the cam follower 31, which contact each other. As the cam mechanism 28 operates due to rotating operation of the operating lever 27, a distance between the cam follower 31 and the pressing member 29 is increased and decreased.

A telescopic locking force increasing mechanism 33, which includes at least one telescopic friction plate 32 and increases a telescopic locking force, is arranged between the cam follower 31 and the first side plate 22 of the tilt bracket 18. Also, a tilt locking force increasing mechanism 35, which includes at least one tilt friction plate 34 and increases a tilt locking force, is arranged between the pressing member 29 and the second side plate 23 of the tilt bracket 18.

Figure 3:
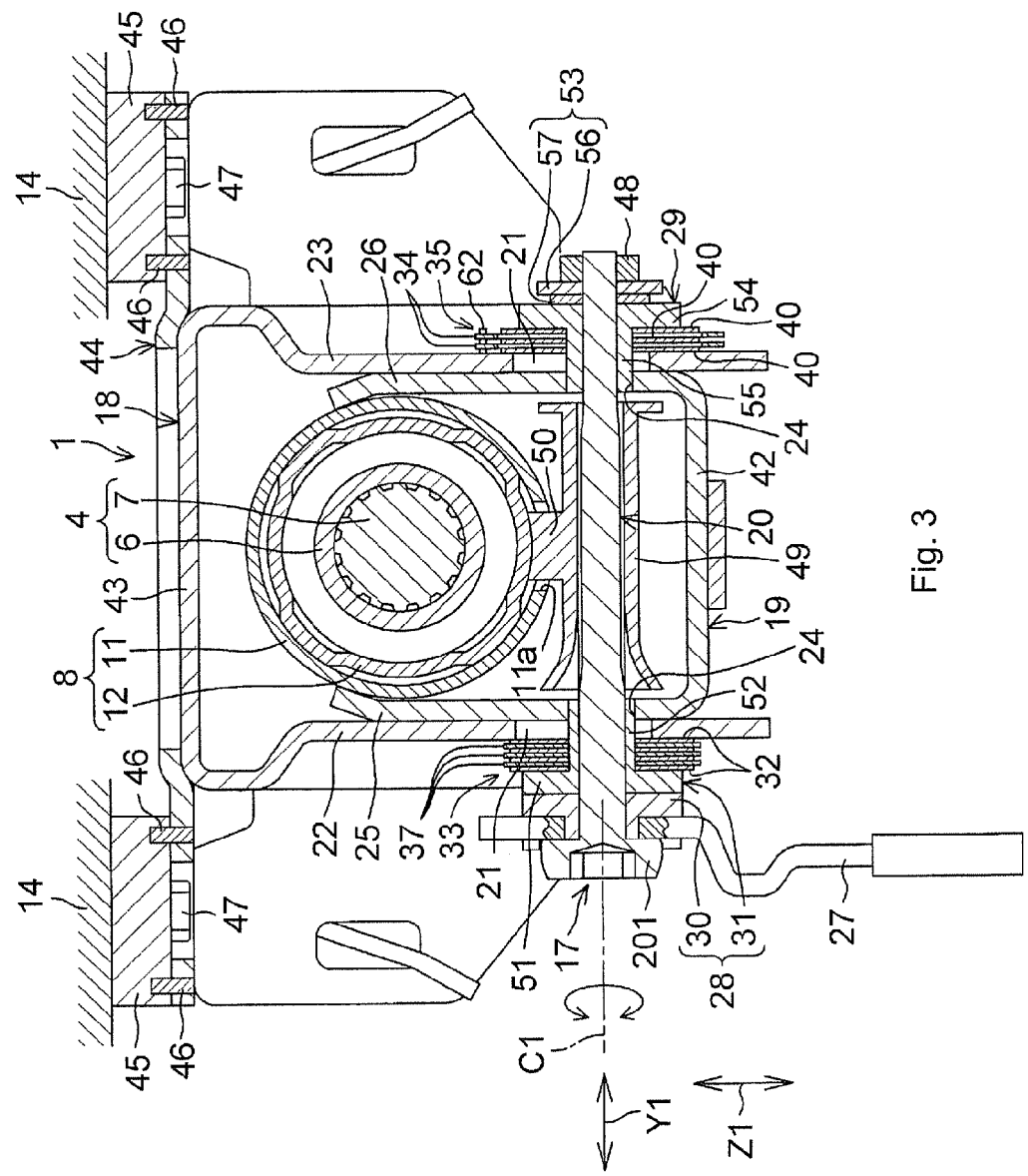
FIG. 3 is a sectional front view of the steering column device.

As shown in FIG. 3, a main feature of this embodiment is that the tilt locking force increasing mechanism 35 and the telescopic locking force increasing mechanism 33 are arranged separately from each other on right and left sides of the tilt bracket 18, respectively, and that the tilt friction plates 34 and the telescopic friction plates 32 are provided separately from each other on the right and left sides of the tilt bracket 18, respectively. For example, the tilt friction plates 34 (the tilt locking force increasing mechanism 35) are arranged on the right side, and the telescopic friction plates 32 (the telescopic locking force increasing mechanism 33) are arranged on the left side when seen from the steering member 2-side. Instead, the telescopic friction plates 32 (the telescopic locking force increasing mechanism 33) may be arranged on the right side, and the tilt friction plates 34 (the tilt locking force increasing mechanism 35) may be arranged on the left side.

Figure 4:
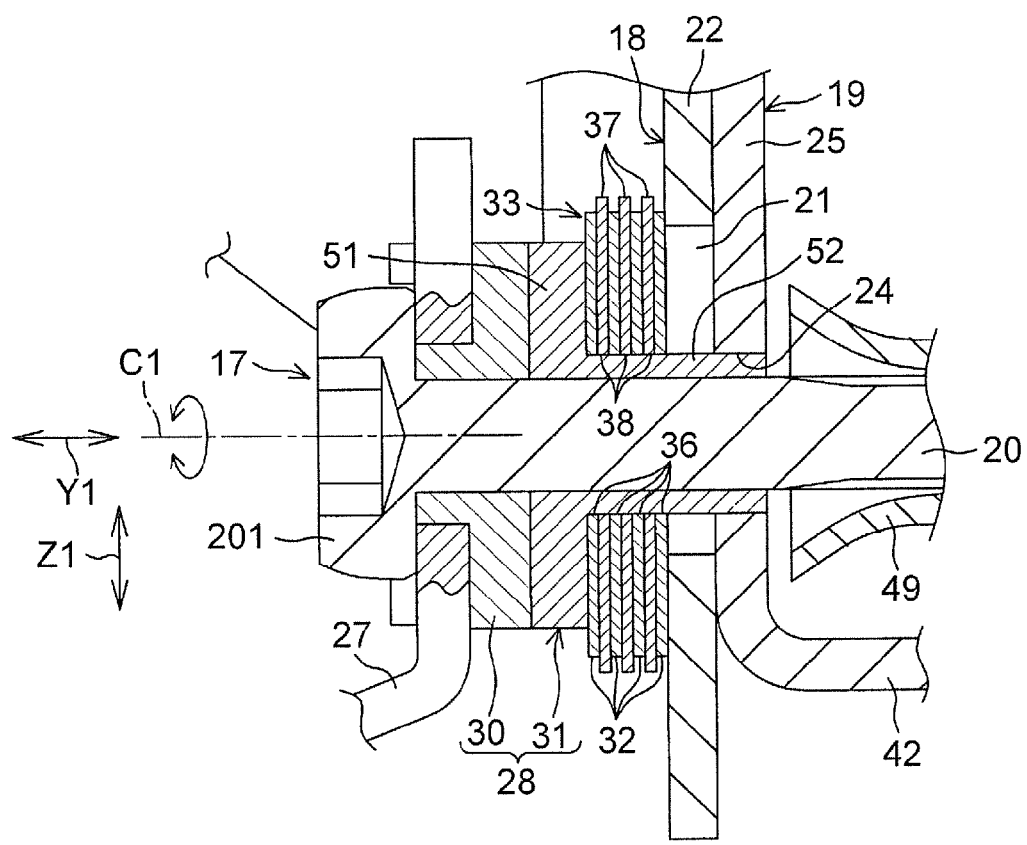
FIG. 4 is a partial enlarged view of FIG. 3, mainly showing a telescopic locking force increasing mechanism.
Figure 6:
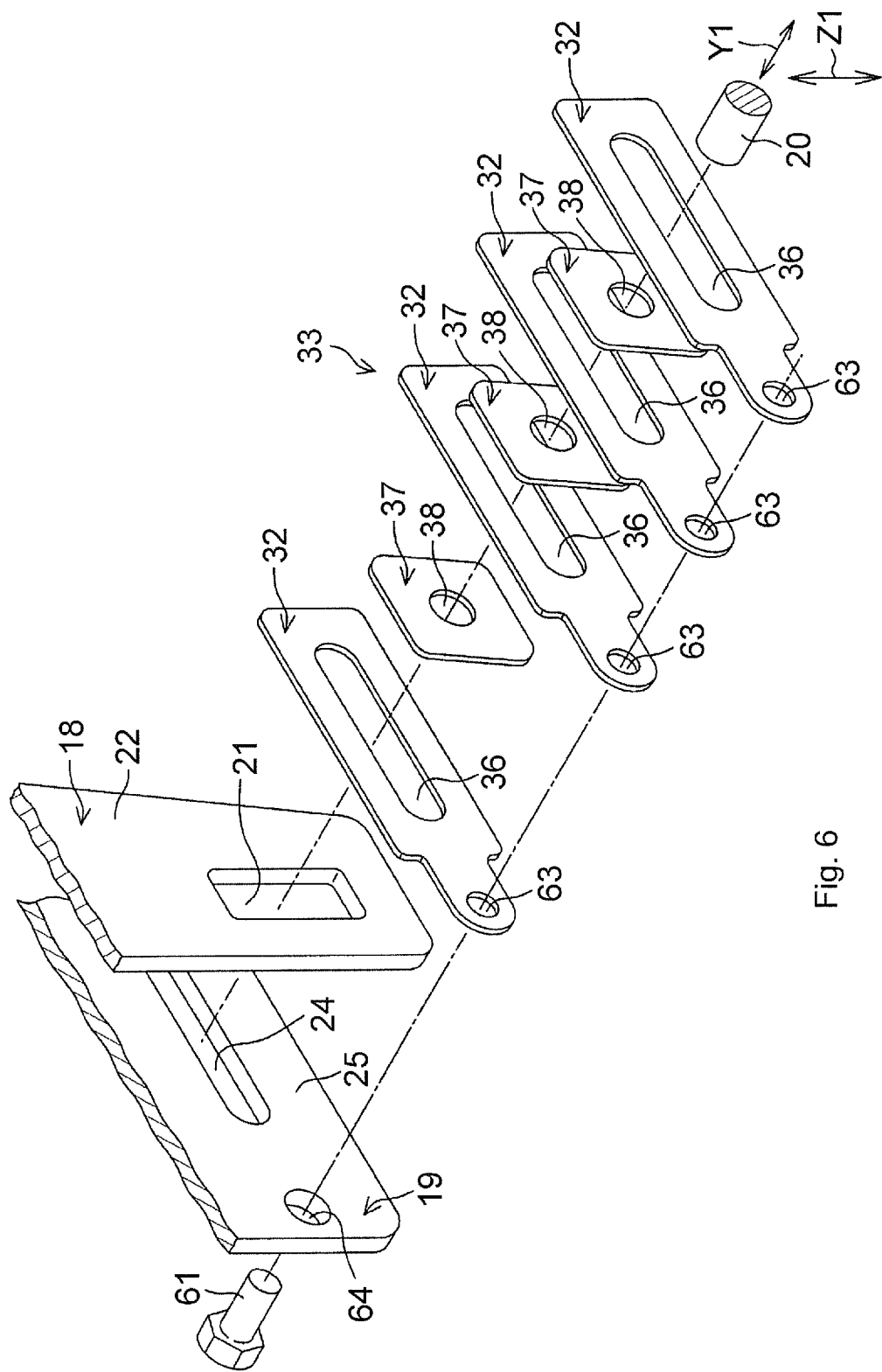
FIG. 6 is a perspective exploded view of the telescopic locking force increasing mechanism.

With reference to FIG. 4 that is a partial enlarged view of FIG. 3, and FIG. 6 that is a perspective exploded view of the telescopic locking force increasing mechanism 33, at least one (in this embodiment, four) telescopic friction plate 32 is provided. Each of the telescopic friction plates 32 has a telescopic opening 36 that consists of, for example, a horizontally long hole through which the fastening shaft 20 is inserted. The plurality of telescopic friction plates 32 is fixed to the third side plate 25 of the telescopic bracket 19 by a first fixing pin 61. The first fixing pin 61 is inserted into through holes 63 in longitudinal one ends of the plurality of telescopic friction plates 32, and is fixed to a fixing hole 64 of the third side plate 25 of the telescopic bracket 19.

The telescopic locking force increasing mechanism 33 includes first washers 37, each of which is provided between the telescopic friction plates 32 that are adjacent to each other. Each of the first washers 37 has a circular hole 38 through which the fastening shaft 20 is inserted. For example, the four telescopic friction plates 32 and the three first washers 37 are alternately arranged. In this case, the total number of pairs of contact surfaces that are frictionally engaged with each other is eight (sixteen surfaces), and the contact surfaces include a pair of side surfaces of each of the telescopic friction plates 32 (eight surfaces in total), and surfaces that respectively face the side surfaces (opposing surfaces of the first washers 37, an outer side surface of the first side plate 22 of the tilt bracket 18, and an inner side surface of a plate portion 51 of the cam follower 31).

Figure 5:
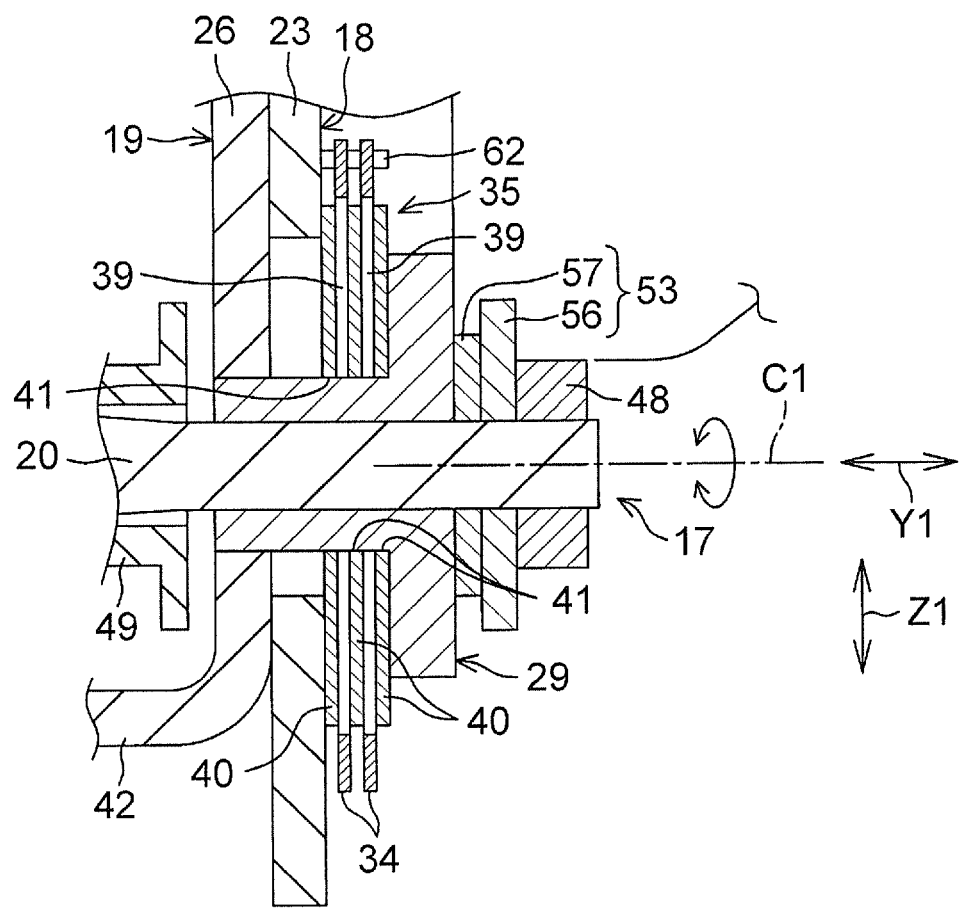
FIG. 5 is a partial enlarged view of FIG. 3, mainly showing a tilt locking force increasing mechanism.
Figure 7:
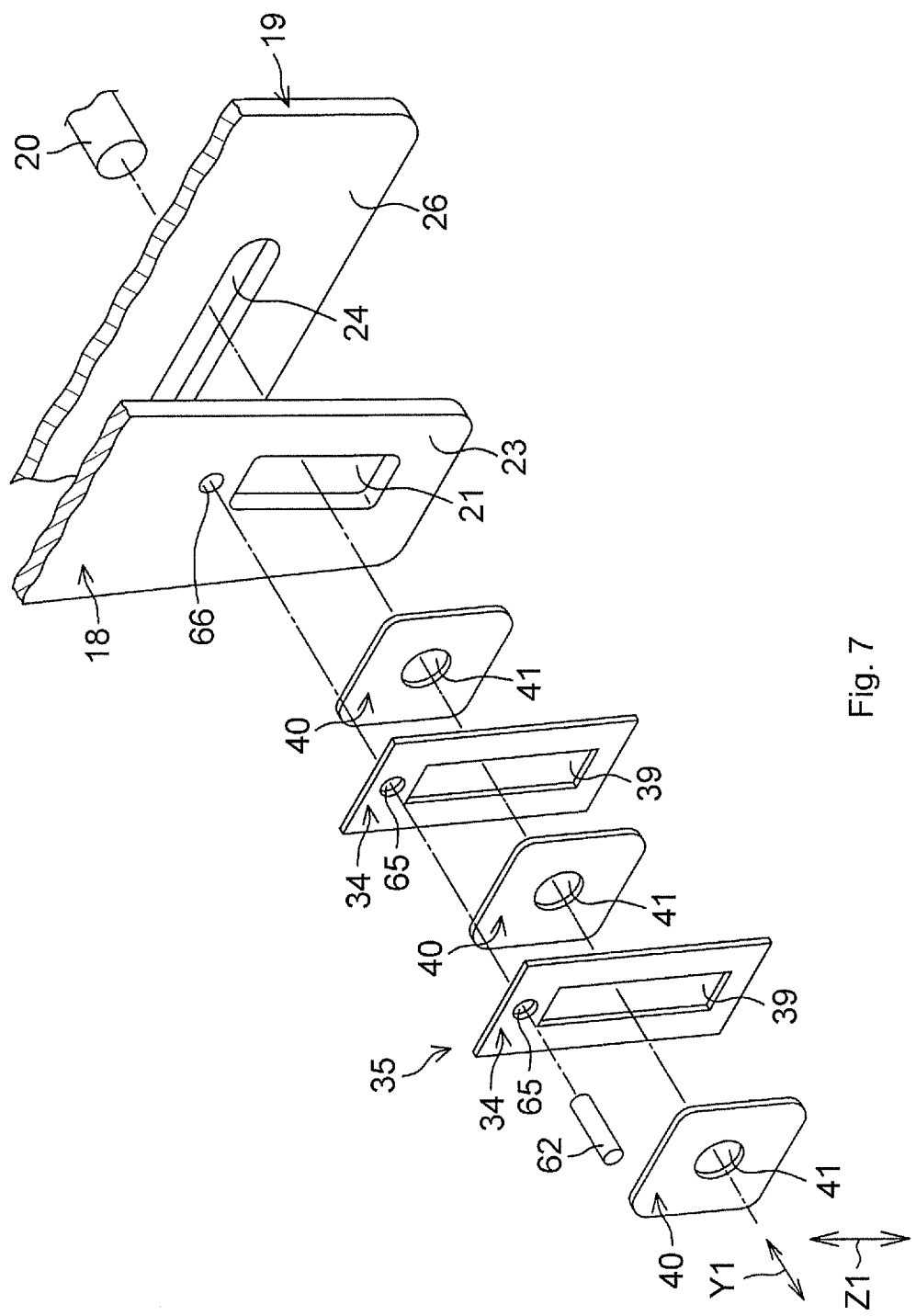
FIG. 7 is a perspective exploded view of the tilt locking force increasing mechanism.

With reference to FIG. 5 that is a partial enlarged view of FIG. 3, and FIG. 7 that is a perspective exploded view of the tilt locking force increasing mechanism 35, at least one (in this embodiment, two) tilt friction plate 34 is provided. Each of the tilt friction plates 34 has a tilt opening 39 that consists of, for example, a vertically long hole through which the fastening shaft 20 is inserted. The tilt friction plates 34 are fixed to the second side plate 23 of the tilt bracket 18 by a second fixing pin 62. The second fixing pin 62 is inserted in through holes 65 in longitudinal one ends of the tilt friction plates 34 and is fixed to a fixing hole 66 of the second side plate 23 of the tilt bracket 18.

The tilt locking force increasing mechanism 35 includes second washers 40. One of the second washers 40 is provided between the second side plate 23 and the adjacent tilt friction plate 34, and one of the second washers 40 is provided between the tilt friction plates 34 that are adjacent to each other. Each of the second washers 40 has a circular hole 41 through which the fastening shaft 20 is inserted. The two tilt friction plates 34 and the three second washers 40 are alternately arranged. In this case, the total number of pairs of contact surfaces that are frictionally engaged with each other is four (eight surfaces), and the contact surfaces include a pair of side surfaces of each of the tilt friction plates 34 (four surfaces in total), and opposing surfaces of the second washers 40, which respectively face the side surfaces.

With reference to FIG. 3, the telescopic bracket 19 is a groove-shaped member that is open upwardly, and is formed to be symmetrical. In other words, one ends of both side surfaces 25 and 26 of the telescopic bracket 19 are fixed to an outer periphery of the outer tube 11. The telescopic bracket 19 includes a connecting plate 42 that connects the other ends of both of the side plates 25 and 26 with each other. The tilt bracket 18 is a groove-shaped member as a whole that is open downwardly, and is formed to be symmetrical. In other words, the tilt bracket 18 includes the first side plate 22 and the second side plate 23, a connecting plate 43 that connects upper ends of both of the side plates 22 and 23 with each other, and a mounting stay 44 with a plate shape, which is fixed to an upper surface of the connecting plate 43 and extends in a substantially right-left direction.

Both of the side plates 25 and 26 of the telescopic bracket 19 are arranged between both of the side plates 22 and 23 of the tilt bracket 18. The tilt bracket 18 is fixed to the vehicle body 14 via a pair of mounting bodies 45 that are connected to the mounting stay 44. The mounting bodies 45 and the mounting stay 44 are connected with each other by breakable pins 46 that are made of a synthetic resin and extend through the mounting stay 44 in a top-bottom direction, and each of the mounting bodies 45 are fixed to the vehicle body 14 by a fixing bolt 47. The pins 46 constitute a connecting member that connects the tilt bracket 18 with the vehicle body 14 so that the tilt bracket 18 is able to be removed from the vehicle body 14 at the time of a second collision.

The lock mechanism 17 includes the fastening shaft 20 that is inserted through the vertically long holes 21 of both of the side plates 22 and 23 of the tilt bracket 18 and through the horizontally long holes 24 of both of the side plates 25 and 26 of the telescopic bracket 19, a nut 48 that is screwed to a threaded portion formed in one end portion of the fastening shaft 20, the cam 30 and the cam follower 31 of the cam mechanism 28 that is fitted to the outer periphery of the fastening shaft 20 at a position in the vicinity of the other end portion of the fastening shaft 20, and the pressing member 29.

A head portion 201 is provided in the other end portion of the fastening shaft 20. The head portion 201 of the fastening shaft 20, and the cam 30 are connected to the operating lever 27 so that the head portion 201 and the cam 30 rotate together with the operating lever 27. A sleeve 49 is connected to an outer periphery of an intermediate portion of the fastening shaft 20 in the axial direction Y1 by spline fitting so that the sleeve 49 is rotatable together with the fastening shaft 20. A pressing portion 50, which is formed of a cam-like protrusion, is provided in an outer periphery of an axial intermediate portion of the sleeve 49 so that the pressing portion 50 is rotatable together with the sleeve 49. The pressing portion 50 is able to press the inner tube 12 through an opening 11a that is provided in the outer tube 11.

In other words, as the sleeve 49 rotates due to operation of the operating lever 27, the pressing portion 50 pushes up the inner tube 12 (the lower tube). Thus, the inner tube 12 is pressed against the outer tube 11 (the upper tube) in a radial direction, thereby inhibiting looseness of the inner tube 12 with respect to the outer tube 11.

With reference to FIG. 3 and FIG. 4, the cam follower 31 has the perforated plate portion 51, and a tubular boss 52, through which the fastening shaft 20 is inserted. The plate portion 51 of the cam follower 31 extends along an outer side surface of the outermost telescopic friction plate 32. An inner side surface of the plate portion 51 of the cam follower 31 presses the outermost telescopic friction plate 32 when fastening is performed by the cam mechanism 28, and thus, regions of the telescopic friction plates 32 and the first washers 37, which are overlapped with each other, are frictionally engaged with each other strongly.

The boss 52 of the cam follower 31 is fitted to the vertically long hole 21 of the first side plate 22 of the tilt bracket 18, and to the horizontally long hole 24 of the third side plate 25 of the telescopic bracket 19 so that the boss 52 is able to move along a direction in which each of the long holes 21 and 24 extends. By forming a width across flat or the like in a portion of the boss 52 that is fitted to the vertically long hole 21 of the first side plate 22, rotation of the boss 52 is restricted by the vertically long hole 21. That is, the cam follower 31 is not rotatable.

With reference to FIG. 3 and FIG. 5, the pressing member 29 and a thrust bearing 53 are provided between the nut 48 that is screwed to one end portion of the fastening shaft 20, and the second side plate 23 of the tilt bracket 18. The pressing member 29 has a perforated plate portion 54 and a tubular boss 55, through which the fastening shaft 20 is inserted. An inner side surface of the plate portion 54 of the pressing member 29 extends along an outer side surface of the outermost tilt friction plate 34. An inner side surface of the plate portion 54 of the pressing member 29 presses the outermost tilt friction plate 34 when fastening is performed by the cam mechanism 28, and thus, regions of the tilt friction plates 34 and second washers 40, which are overlapped with each other, are frictionally engaged with each other strongly.

The boss 55 of the pressing member 29 is fitted to the vertically long hole 21 of the second side plate 23 of the tilt bracket 18, and to the horizontally long hole 24 of the fourth side plate 26 of the telescopic bracket 19 so that the boss 55 is able to move along a direction in which each of the long holes 21 and 24 extends. By forming a width across flat or the like in a portion of the boss 55 that is fitted to the vertically long hole 21 of the second side plate 23, rotation of the boss 55 is restricted by the vertically long hole 21. That is, the pressing member 29 is not rotatable.

The thrust bearing 53 is provided between the plate portion 54 of the pressing member 29, and the nut 48, and includes a thrust washer 56, and a needle roller thrust bearing 57 that is provided between the thrust washer 56 and the plate portion 54 of the pressing member 29. Due to the function of the thrust bearing 53, the nut 48 is able to rotate smoothly together with the fastening shaft 20. With reference to FIG. 3, the cam follower 31 and the pressing member 29 press the corresponding side plates 22 and 23 of the tilt bracket 18, thereby fastening the side plates 22, 23, 25, and 26 of both of the brackets 18 and 19. Thus, tilt locking and telescopic locking are achieved.

According to this embodiment, since the at least one tilt friction plate 34 and the at least one telescopic friction plate 32 are provided separately from each other on the right and left sides, respectively, it is possible to set retaining forces in the tilt direction (the height direction Z1) and the telescopic direction (the axial direction X1) independently from each other, and therefore, a degree of freedom of designing is high. At the time of a second collision, a stick-slip force is generated, and the stick-slip force increases the retaining forces of the both of the brackets 18 and 19. If slippage occurs between both of the brackets 18 and 19 in either the tilt direction or the telescopic direction, the retaining force in the other direction is maintained. Therefore, it is possible to practically keep a high retaining force at the time of a second collision.

Since the at least one tilt friction plates 34 and the at least one telescopic friction plate 32 are arranged separately from each other on the right and left sides of the tilt bracket 18, respectively, the structure is simpler, and is thus assembled more easily and less expensive, compared to the conventional case in which both frictional plates are alternately combined with each other. Also, by using the plurality of telescopic friction plates 32, and the first washers 37, each of which is provided between the telescopic friction plates 32, the number of contact surfaces is increased. Similarly, by using the plurality of tilt friction plates 34, and the second washers 40, each of which is provided between the tilt friction plates 34, the number of contact surfaces is increased. Therefore, it is possible to individually increase the retaining force in the tilt direction, and the retaining force in the telescopic direction between both of the brackets 18 and 19.

One fixing pin 62 and one fixing pin 61 are provided on the right and left sides of the tilt bracket 18, respectively, and fix the corresponding friction plates 34 and 32. Therefore, the structure is simplified, and manufacturing costs are thus reduced even further. When the tilt bracket 18 is removed from the vehicle body 14 at the time of a second collision, a stick-slip force increases retaining forces of the brackets 18 and 19. Hence, the column jacket 8 is contracted straight, and thus an impact absorbing function is fulfilled.

The present invention is not limited to the foregoing embodiment. For example, the second side plate 23 of the tilt bracket 18 is the right side plate, and the third side plate 25 of the telescopic bracket 19 is the left side plate. However, alternatively, the third side plate 25 of the telescopic bracket 19 may be the right side plate, and the second side plate 23 of the tilt bracket 18 may be the left side plate. Other various changes may be made without departing from the range of claims of the present invention.

What is claimed is:

1. A steering column device comprising:
    a tubular column jacket that supports a steering shaft so that the steering shaft is rotatable, the steering shaft having one end to which a steering member is attached;
    a tilt bracket that is fixed to a vehicle body, and has a first side plate and a second side plate, each of the first side plate and the second side plate having a vertically long hole;
    a telescopic bracket that is fixed to the column jacket, and has a third side plate and a fourth side plate that extend along the first side plate and the second side plate, respectively, each of the third side plate and the fourth side plate having a horizontally long hole;
    a lock mechanism that includes a fastening shaft inserted through the horizontally long holes and the vertically long holes, and achieves telescopic locking and tilt locking by pressing the first side plate and the second side plate onto the third side plate and the fourth side plate, respectively;
    a telescopic locking force increasing mechanism that includes a telescopic friction plate having a telescopic opening through which the fastening shaft is inserted, the telescopic friction plate being fixed to the third side plate of the telescopic bracket; and
    a tilt locking force increasing mechanism that includes a tilt friction plate having a tilt opening through which the fastening shaft is inserted, the tilt friction plate being fixed to the second side plate of the tilt bracket, wherein
    the telescopic friction plate and the tilt friction plate are provided separately from each other, one of the telescopic friction plate and the tilt friction plate being provided on a right side of the tilt bracket, and the other of the telescopic friction plate and the tilt friction plate being provided on a left side of the tilt bracket.

2. A steering column device according to claim 1, wherein
    the telescopic locking force increasing mechanism includes a first washer that is provided between a plurality of the telescopic friction plates, the first washer has a circular hole through which the fastening shaft is inserted, and the first washer is frictionally engaged with the telescopic friction plates, and
    the tilt locking force increasing mechanism includes a second washer that is provided between a plurality of the tilt friction plates, the second washer has a circular hole through which the fastening shaft is inserted, and the second washer is frictionally engaged with the tilt friction plates.

3. The steering column device according to claim 2, comprising:
    only one first fixing pin that is inserted through the plurality of telescopic friction plates and fixed to the third side plate of the telescopic bracket; and
    only one second fixing pin that is inserted through the plurality of tilt friction plates and fixed to the second side plate of the tilt bracket.

4. The steering column device according to claim 1, comprising
    a connecting member that connects the tilt bracket with the vehicle body so that the tilt bracket is able to be removed from the vehicle body at a time of a second collision, wherein
    the column jacket is configured so that the column jacket is contracted to absorb an impact at the time of the second collision.

* * * * *